(12) United States Patent
Dougall et al.

(10) Patent No.: US 6,496,521 B2
(45) Date of Patent: *Dec. 17, 2002

(54) TELECOMMUNICATIONS NETWORKS

(75) Inventors: Steven S Dougall, Suffolk (GB);
Michael G Foxton, Suffolk (GB);
Jonathan Hopkins, Suffolk (GB)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,593

(22) PCT Filed: Jun. 24, 1997

(86) PCT No.: PCT/GB97/01712

§ 371 (c)(1),
(2), (4) Date: Mar. 5, 1998

(87) PCT Pub. No.: WO98/01006

PCT Pub. Date: Jan. 8, 1998

(65) Prior Publication Data

US 2001/0043590 A1 Nov. 22, 2001

(30) Foreign Application Priority Data

Jun. 28, 1996 (EP) .................................. 96304766

(51) Int. Cl.$^7$ .................................................. H04J 3/12
(52) U.S. Cl. ........................ 370/524; 370/493; 379/229
(58) Field of Search .................................. 370/352, 353,
370/354, 355, 356, 522, 524, 493; 379/209,
210, 211, 212, 229, 230, 231, 232, 234,
235

(56) References Cited

U.S. PATENT DOCUMENTS

| | | | |
|---|---|---|---|
| 5,193,110 A | | 3/1993 | Jones et al. |
| 5,375,124 A | * | 12/1994 | D'Ambrogio et al. ...... 370/420 |
| 5,490,251 A | | 2/1996 | Clark et al. |
| 5,509,062 A | * | 4/1996 | Carlson ........................ 579/210 |
| 5,550,834 A | | 8/1996 | D'Ambrogio et al. |
| 5,550,907 A | * | 8/1996 | Carlsen ........................ 379/207 |
| 5,550,911 A | | 8/1996 | Bhagat et al. |
| 5,761,294 A | * | 6/1998 | Shaffer et al. .............. 379/230 |
| 5,912,887 A | * | 6/1999 | Sehgal ........................ 370/354 |
| 5,991,389 A | | 11/1999 | Ram et al. |

FOREIGN PATENT DOCUMENTS

| EP | 0480634 A2 | 4/1992 |
|---|---|---|
| FR | 2671251 | 7/1992 |

OTHER PUBLICATIONS

Patent Abstracts of Japan, vol. 014, No. 133 (E–0902), Mar. 13, 1990 & JP 02 001670 A (Fujitsu Ltd) Jan. 5, 1990.

Tao et al, "Internet Access Via Baseband and Broadband ISDN Gateways", Proceedings of the Annual International Pheonix Conference on Computers and Communications, Phoenix, Apr. 12–15, 1994.

Betts et al, "ISDN and Intelligent Network Based Telepoint Service", Electrical Communication, vol. 64, No. 1, Jul. 1, 1990, pp. 85–94, XP000236340.

\* cited by examiner

*Primary Examiner*—Douglas Olms
*Assistant Examiner*—Bob A. Phunkulh
(74) *Attorney, Agent, or Firm*—Nixon & Vanderhye P.C.

(57) ABSTRACT

In order to obtain further instruction from connected ISDN terminals, a service resource function is provided. The function is responsive to data carried over a separate data network to provide a prompt and collect service to a user of ISDN. The invention allows the addition of prompt and collect services such as account allocation to be provided.

10 Claims, 4 Drawing Sheets

TELECOMMUNICATIONS NETWORKS

REFERENCE TO RELATED APPLICATION

This application is related to our copending commonly assigned U.S. application Ser. No. 09/051,029 filed Apr. 2, 1998 (claiming priority from PCT/GB97/01712 filed Jun. 24, 1997 which, in turn, claims priority from European application 96304771.7 filed Jun. 28, 1996).

BACKGROUND OF THE INVENTION

1. Field of the Invention

The present invention relates to telecommunications networks and more particularly to telecommunications networks of the kind requiring communications between the network and terminals attached thereto without provision of a voice communications path at the initial phase of a communications call.

2. Related Art

Many services provided by telecommunications networks will require information additional to a telephone number for example to enable completion of a connection through the transport network. For example, credit or charge card calls may require entry of a personal identification number (PIN) and/or an account number prior to proceeding. Where such services are provided after the customer has been connected through the network to a peripheral a voice or other prompt may be used to request the customer to enter further detail. Such services are therefore often referred to as "prompt and collect" services.

Where a customer has a telephone instrument or other terminal adapted to signal the network by use of multi-frequency tones, it is possible for the prompt and collect service to operate by the coding of the tones without establishing a complete speech path through the network. However, many communications connections are not by way of analogue lines to the customer's premises but are rather of a digital type and, more particularly, of a type known as ISDN in which a single customer connection carries a plurality 64 Kbs digital bearer channels and a data channel.

ISDN terminals do not function efficiently in the provision of multi-frequency tones until the terminal is put into a speech phase. However, putting the call into the speech phase prior to effecting a connection simply to enable prompt and collect services to operate may result in charging difficulties as the customer equipment may see a network response as a valid answer.

Further, if the ISDN call originates from a data terminal, ISDN standards do not permit switching back to a data phase after switching into voice phase communication. In many cases also data terminals may not include multifrequency transmission capability and/or may not include speaker or headset facilities to receive voice prompts.

SUMMARY OF THE INVENTION

According to the present invention there is provided a telecommunications network including switch means which have customer connections which receive a bit stream from customers, the bit stream comprising the plurality of bearer channels and at least one data channel, control means of the switch being responsive to data from the data channel to set up bearer channel calls through the network, and network control means responsive to stored data associated with a calling connection identity or a called connection identity to accept data from another data network in respect of bearer channel calls.

Preferably the switch includes means responsive to a portion of the data transmitted in the data channel to forward received data either to control means of the switch or to a data network.

The data network may be of the kind referred to as an X25 network which may be the network from which the network control means recovers data.

The service control means may be arranged to cause means connected to the data network to transmit prompt information by way of the data network to the calling connection to prompt a user to forward further information by way of the data network.

In an alternative arrangement the data network may be an electronic mail type environment in which messages are transferred to an E-mail address of the network, apparatus associated with the service control function having an appropriate address to which mail relating to the bearer channel may be transmitted. The resource function associated with forwarding prompt data may forward prompt data to an E-mail address requiring a reply from the user.

According to a feature of the invention there is provided a digital telecommunications network having a plurality of switching units for providing transmission of digital bearer channels between first and second selectable service points, the second service point being determined by data from a data channel transmitted from the first service point, control means of the network being responsive to data identifying the first or second service points to provide additional functionality of the kind requiring further defining data from the first service point characterised in that an interface is provided between the control means of the network and a separate data network for providing transmission of data channels, the interface being responsive to the control means to transmit prompting data to the first service point by way of the data network and to collect data returned thereby for transmission to the control means such that completion of a call through the first network is modified by data received through the second network.

BRIEF DESCRIPTION OF THE DRAWINGS

A telecommunications network in accordance with the invention will now be described by way of example only with reference to the accompanying diagrams of which.

DETAILED DESCRIPTION OF THE DRAWINGS

Figure 1:
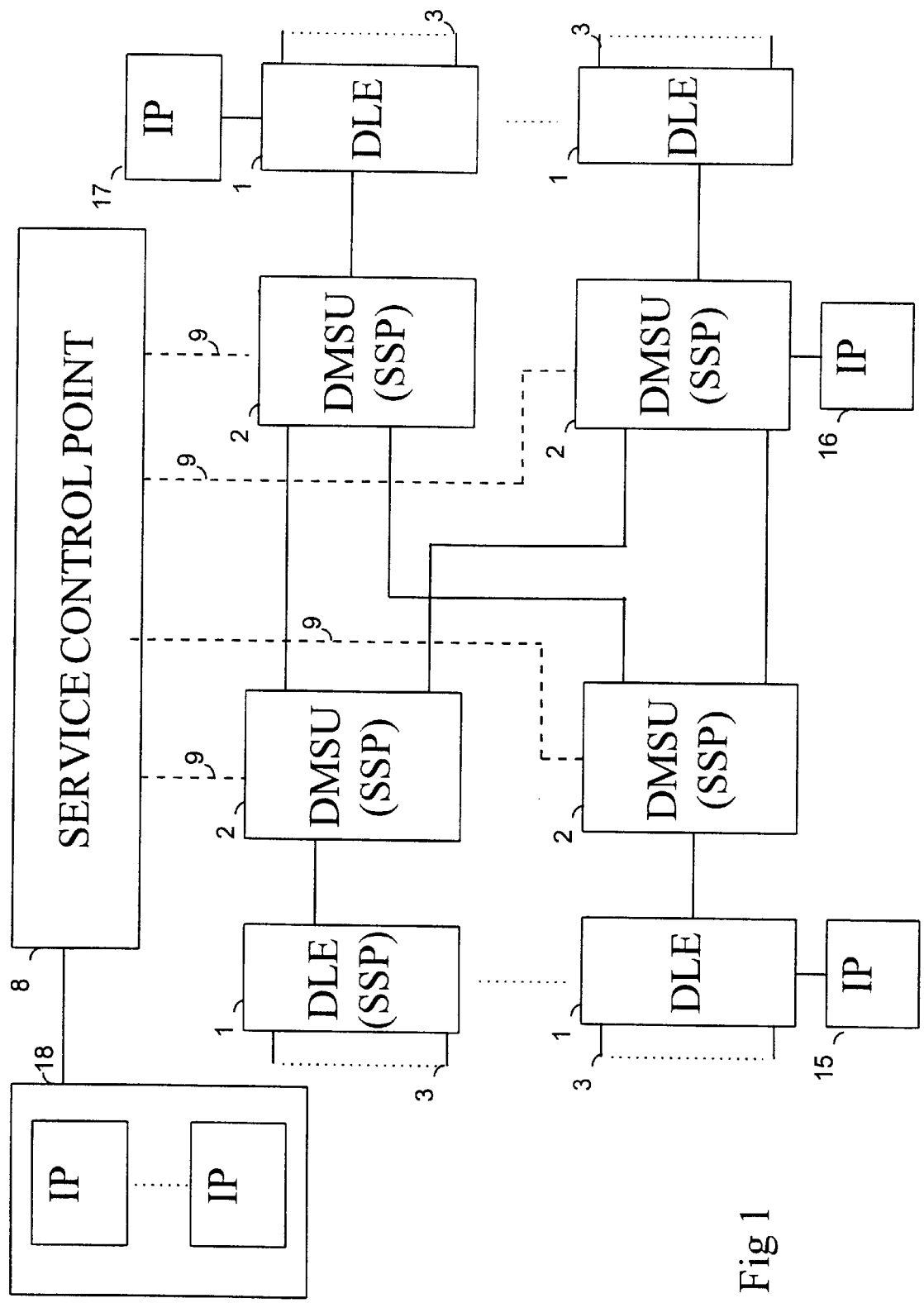
FIG. 1 shows a telecommunications network of the kind sometimes called an intelligent network.

Referring first to FIG. 1 there is shown a typical modern digital public switched telecommunications network (PSTN) including interconnected digital main switching units (DMSU) 2 and digital local exchanges (DLE) 1 having connections 3 to customer premises. This typical network allows communication between any of the customer lines 3 and any other customer line 3 by effecting switching through the digital local exchanges and digital main switching units in response to information signalled by the customer.

While basic telephony, that is where a direct relationship exists between the information signalled and the connection effected, is easily provided by such a system where significant number translation facilities are required or complex additional services such as allocating costings across a number of accounts may be needed, additional intelligence is required. Such additional intelligence may be provided by a single network point or several network points having substantial intelligence and in the network shown a single service control point 8 has been provided. If a local service switching point, either a digital local exchange 1 or DMSU 2 detects a requirement for additional instruction using C7 signalling on virtual paths 9, for example, and transmitting relevant information to the service control point 8, instruction on further handling of the call within the core transport network may be provided.

Such instruction may require the connection of a calling customer to an intelligent peripheral 15, 16, 17, 18 by way of the network to effect functions such as prompt and collect.

Figure 2:
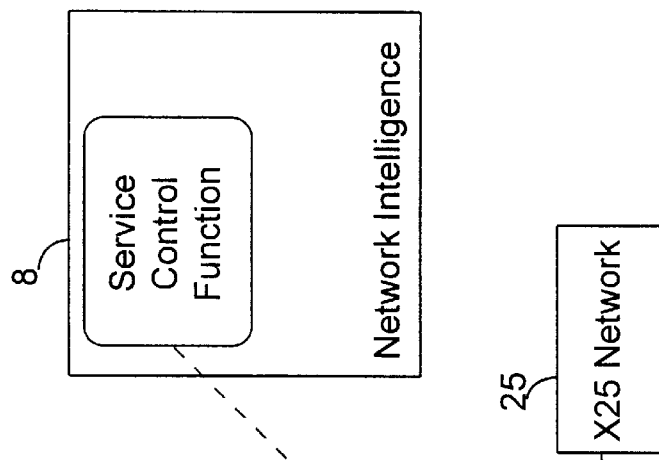
FIG. 2 shows a detail of one of the digital local exchanges in the telecommunications network of FIG. 1.
Figure 3:
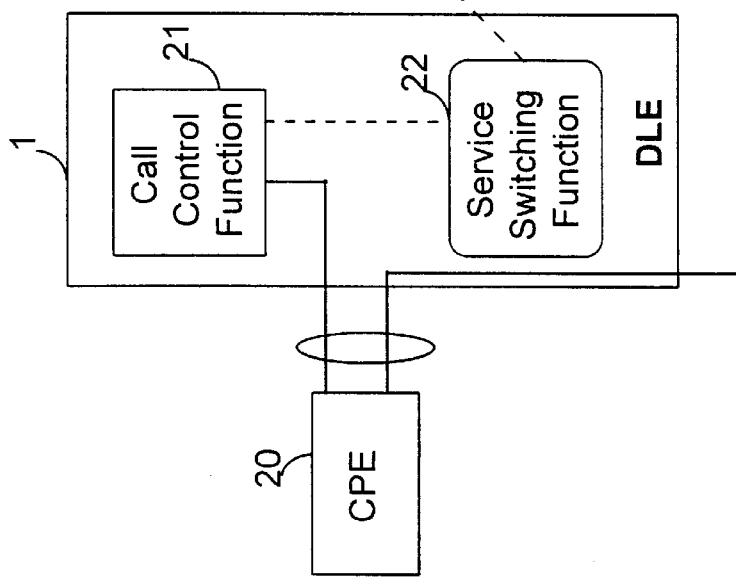
FIG. 3 shows schematically data transmission between customer premises equipment and the exchange of FIG. 2.
Figure 3:
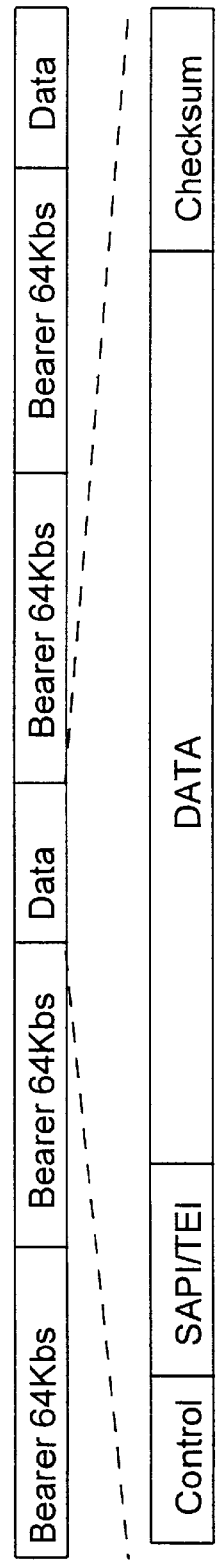

Turning now to FIG. 2 and FIG. 3, ISDN terminals at customer premises (CPE) 20 transmits a digital stream of intermixed bearer channels and data channels which on entry to the digital local exchange 1 are routed accordingly (this function not shown separately) and each data message in the data channel is examined to determine its function.

Referring specifically to FIG. 3, the function of any particular data message is determined by a service access port identifier (SAPI) which is one of 256 channels identifying the appropriate destination for the data which follows. Specifically an SAPI of 0 identifies a message for CCF (CCF) 21 of DLE 1 and for example SAPI 16 identifies that the message is to be transferred via an X25 data network schematically represented at 25. For completeness it is here noted that a terminal endpoint identifier (TEI) identifies one of 256 potential destinations. One example of this is that in X25 messages identified by an SAPI of 16 the TEI identifies a service provider. Some other SAPIs are allocated to specific functions by international agreement on ISDN services and some are reserved for future network expansion.

The bearer channels arriving at the DLE 1 from the customer premises equipment 20, which may be for example a fax machine, telephone or computer ISDN card originated, are switched through the network in accordance with set up data provided to the exchange call control via a SAPI 0 data message.

For example where a voice call is using one of the 64 Kbs bearer channels, the SAPI data message may contain a called number to which calls are to be directed. If additional functionality based either on the source of the call or destination of the call is indicated then the CCF 21 will normally cause the service switching function (SSF) 22 of the DLE 1 to request instruction from the service control function (SCF) 8.

Referring again to FIG. 1, for analogue calls if the service control point 8 identifies the need for prompt and collect functions it would normally cause the SSF to connect an appropriate intelligent peripheral which forwards a voice prompt, collects customer responses and forwards the additional data. Once the additional data has been forwarded to the service control function 8 it may instruct the SSF 22 to respond to that data in a particular manner, thus effecting completion of connection through the core transport network or connecting a customer to further intelligent peripherals 15–18.

Figure 4:
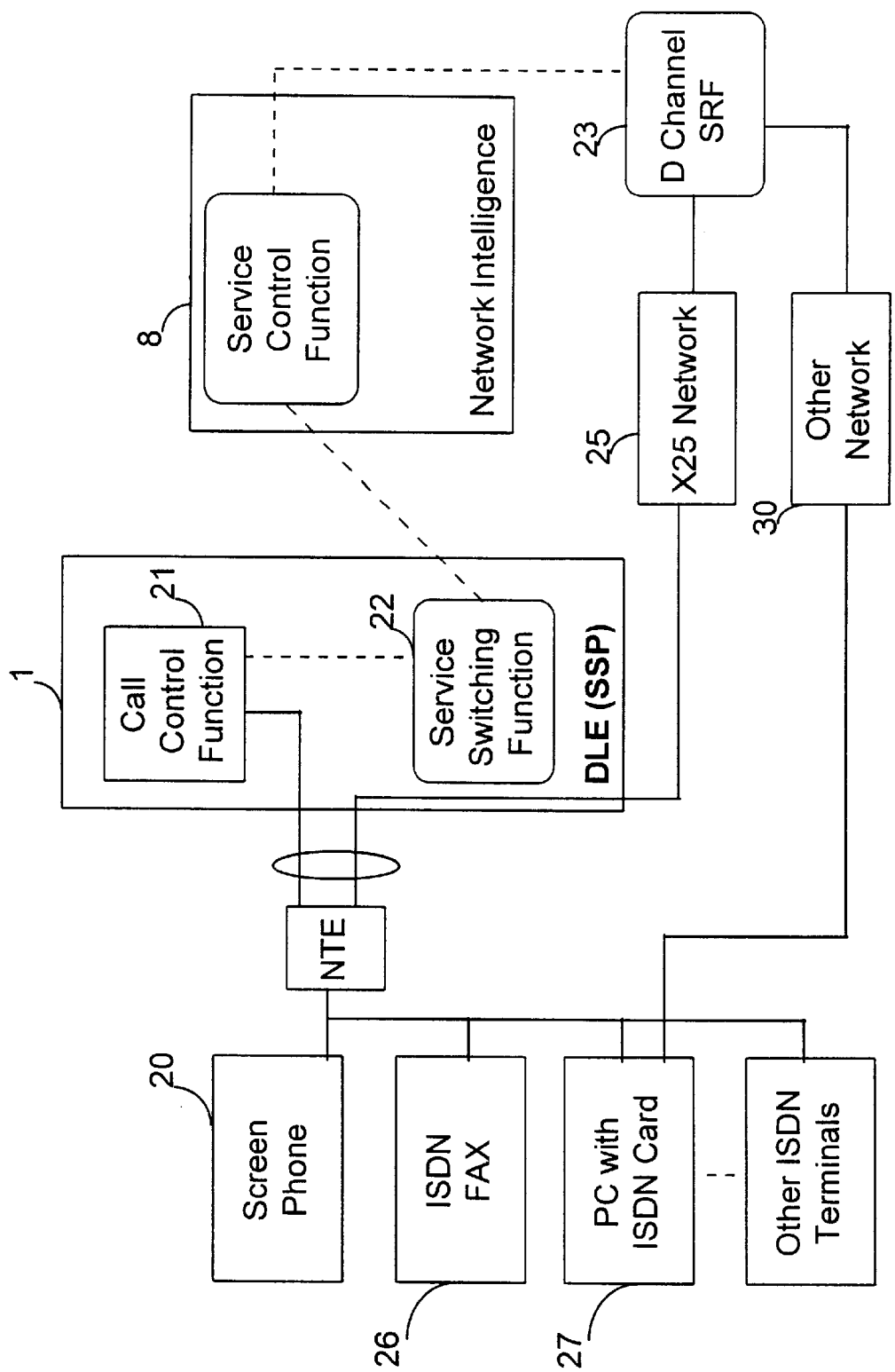
FIG. 4 shows a modification of the network of FIG. 2.

Referring now to FIG. 4, when an ISDN terminal 20, 26, 27, 28 wishes to transmit using a 64 Kbs bearer channel an initial data message with SAPI 0 containing the destination number, for example, is transmitted to the DLE 1. The SSP recognises the SAPI 0 as a call control message and forwards the call control data to the CCF 21. When the CCF seeks to effect switching using the SSF 22 a trigger indicating that additional functionality in respect of the call will result. Thus access is made through the C7 signalling network using the intelligent network applications part (INAP) to the SCF 8.

The SCF 8 will transfer data identifying the terminal to a D channel service resource function (SRF) 23, which is connected to the X25 network 25. The D channel SRF 23 now uses the X25 domain to forward a call request packet via the network D channel to the identified terminal, the data therein either causing a display at the transmitting terminal to prompt the user to forward additional data information or providing a control to cause a data terminal, for example, to transmit the additional control information required.

Figure 5:
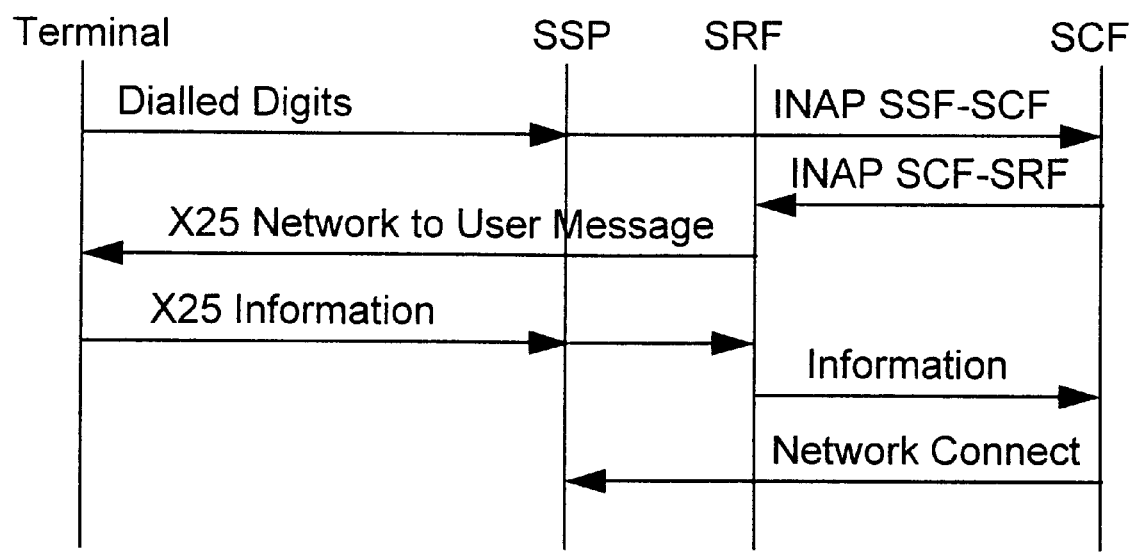
FIG. 5 shows schematically data signalling interchanges in the network of FIG. 4.

The keyed digits or transmitted data is assembled into an X25 package with an SAPI of 16 and this information is transmitted by the X25 network, the exchange gateway identifying an SAPI 16 as an X25 message, to the SRF 23. Having received the appropriate information the SRF 23 transfers the data to the SCF 8 using INAP and the call may now be completed with the SCF 8 causing the SSF 22 to connect the call through the network in known manner to its requested destination. The transfer of data is shown schematically in FIG. 5 from which it may be seen that initially the dialled digits are transferred from the terminal to the CCF using the 1420 protocol. Internal CCF to SSF signalling results in an INAP message to the SCF, the SCF requesting via INAP action by the SRF which forwards X25 network message to the user. X25 information is returned to the SRF which in turn uses INAP protocols to forward data to the SCF. Finally, the SCF uses INAP to control the SSF 22.

While reference to SAPI 0 and SAPI 16 are mentioned herein as used in accordance with current internationally agreed ISDN standards, it will be appreciated that other SAPIs may be used to direct the call via alternative networks.

In respect of other networks, for example, directing data through an internet or E-mail address to the SRF 23 is possible. Thus provided that the SRF 23 is addressed with a data message identifying the specific bearer channel originating from the user, then received data may be successfully passed using INAP to ensure correct connection of the bearer channel and association of additional data therewith.

As an example the PC 27 may have an alternative access through other networks, In this case the initial associated data message may be interpreted by the SCF 8 as requiring connection through a particular network schematically represented at 30. Here, the SRF 23 would be instructed to forward a prompt message by way of the other network 30 to the PC 27 possibly using an internet or E-mail type address. Similarly, the SRF channel 23 will received data by way of an E-mail type message from the other network 30. The transfer of messages between E-mail addresses using internet type networks is well-known and the function is not further described herein.

Although the invention has been described with reference specifically with reference to a digital telecommunications network and the X25 network, it will be appreciated that other networks could be used to interface set up data in relation to a bearer channel through alternative networks.

However, in particular with the International Telecommunications Union definition of the X25 protocol, using a fast select facility with restricted response enables up to 120 octets of information to be exchanged between two n points without setting up a virtual call. Accordingly, a call request with up to 128 octets of prompt information being forward by way of the X25 domain with a call clear center's response with up to 128 octets of information as ideally suited to most prompt and collect information exchanges.

Some minor changes to terminals to ensure that they are capable of working via the X25 packet service may be required. However, providing a prompt and collect service in the manner described allows the provision of such service to digital telecommunications equipment without expensive network modification to, for example, digital local exchanges.

What is claimed is:

1. A telecommunications network including:

switch means which have customer connections which receive a bit stream from customers, the bit stream comprising a plurality of bearer channels and at least one data channel, control means of the switch being responsive to data from the data channel to set up bearer channel calls through the network, a data store storing data associated with at least some customer connections identifying additional data to be obtained during set up of a bearer channel call, and network control means responsive to said stored data associated with a calling connection identity or a called connection identity to accept data from another data network during the set-up of a bearer channel call to determine in respect of that bearer channel additional non-voice information to associate with that one and the same call.

2. A telecommunications network as in claim 1, wherein said switch includes means responsive to a portion of the non-voice data transmitted in the data channel to forward received non-voice data in respect of the same bearer channel call to control means of the switch.

3. A telecommunications network as in claim 1, in which the data network is of the kind referred to as an X25 network.

4. A telecommunications network as in claim 1 in which the network control means is arranged to cause means connected to the data network to transmit prompt information by way of the data network to prompt a user to forward further information.

5. A telecommunications network as in claim 4 in which the network control means receives additional information by way of the data network.

6. A telecommunications network as in claim 1 the collected data is received by way of an e-mail address node to which the network control means has access.

7. A telecommunications network as in claim 6, comprising:

an interface between the network control means and the e-mail address node responsive to instructions from the control means to transmit prompt data to an e-mail address node to prompt the user to forward control information relating to the telecommunications network bearer call.

8. A digital telecommunications network comprising:

a plurality of switching units providing transmission of digital bearer channels between first and second selectable service points, the second service point being determined by data from a data channel transmitted from the first service point, control means responsive to data identifying the first or second service points to provide additional functionality of the kind requiring further defining data from the first service point, an interface disposed between the control means of the network and a separate data network providing transmission of data channels, the interface being responsive to the control means to transmit prompting data to the first service point by way of the data network and to collect data returned thereby for transmission to the control means such that completion of a call through the first network is modified by data received from the second network during set up of the call through the first network.

9. A telecommunications network having data prompt and collect capability during call setup without use of a voice speech path, said network comprising:

switched digital communication channels connectable between customer connections and including a switch control capable of setting up a digital communication channel from a calling customer connection to a called customer connection;

a data store containing data associated with at least some customer connections identifying additional data to be obtained during setup of a communications channel; and said switch control including means for prompting and collecting additional data during call setup without establishing a voice speech path.

10. A method of operating a telecommunications network having data prompt and collect capability during call setup without use of a voice speech path, said method comprising:

providing switched digital communication channels connectable between customer connections using a controlled switch capable of setting up a digital communication channel from a calling customer connection to a called customer connection, storing data associated with at least some customer connections identifying additional data to be obtained during setup of a communications channel; and prompting and collecting additional data during call setup without establishing a voice speech path.

* * * * *